United States Patent
Schenker

(10) Patent No.: US 8,668,380 B2
(45) Date of Patent: Mar. 11, 2014

(54) METHOD FOR OPERATING A CALORIMETER

(75) Inventor: Benedikt Schenker, Würenlingen (CH)

(73) Assignee: Mettler-Toledo AG, Greifensee (CH)

( * ) Notice: Subject to any disclaimer, the term of this patent is extended or adjusted under 35 U.S.C. 154(b) by 766 days.

(21) Appl. No.: 12/476,474

(22) Filed: Jun. 2, 2009

(65) Prior Publication Data
US 2009/0310646 A1  Dec. 17, 2009

(30) Foreign Application Priority Data

Jun. 13, 2008  (EP) .................................. 08158195

(51) Int. Cl.
*G01K 17/04*  (2006.01)

(52) U.S. Cl.
USPC ............... 374/31; 422/51; 422/10; 422/141; 436/147

(58) Field of Classification Search
USPC ........................................... 422/51; 436/147
See application file for complete search history.

(56) References Cited

U.S. PATENT DOCUMENTS

| | | | | |
|---|---|---|---|---|
| 3,841,155 A | * | 10/1974 | Koehler et al. ................ | 374/33 |
| 4,088,447 A | * | 5/1978 | Walker ........................ | 436/147 |
| 4,130,016 A | * | 12/1978 | Walker ........................ | 374/34 |
| 4,456,389 A | * | 6/1984 | Regenass et al. ............. | 374/31 |
| 4,670,404 A | * | 6/1987 | Swift et al. .................... | 436/147 |
| 4,846,584 A | * | 7/1989 | Burch et al. ................... | 374/31 |
| 4,892,707 A | | 1/1990 | Stockton et al. | |
| 4,963,499 A | * | 10/1990 | Stockton et al. .............. | 436/147 |
| 5,174,655 A | * | 12/1992 | Litz et al. ........................ | 374/31 |
| 5,439,291 A | * | 8/1995 | Reading ........................... | 374/11 |
| 5,599,104 A | * | 2/1997 | Nakamura et al. ............. | 374/12 |
| 5,716,133 A | * | 2/1998 | Hosokawa et al. ........... | 374/121 |
| 6,869,214 B2 | * | 3/2005 | Plotnikov et al. .............. | 374/31 |

(Continued)

FOREIGN PATENT DOCUMENTS

| | | |
|---|---|---|
| CN | 2831066 Y | 10/2006 |
| DE | 4405267 C2 | 8/1997 |

(Continued)

OTHER PUBLICATIONS

Frankvoort, W. et al., "Design and use of a dynamic controlled adiabatic liquid-phase reaction calorimeter", Journal of Physics E: Scientific Instruments, 1977, pp. 906-910, vol. 10., Great Britain.

(Continued)

*Primary Examiner* — Gail Verbitsky
(74) *Attorney, Agent, or Firm* — Standley Law Group LLP

(57) ABSTRACT

A method for operating a calorimeter and a calorimeter that is operable to perform the method, wherein the calorimeter has a reactor (1) for receiving a reaction medium, a reactor jacket (2), an in-reactor heater (4) controlled by means of a first controller (6), an outer temperature control unit (9) in thermal contact with the reactor and controlled by a second controller (10), and a measurement sensor (5) arranged in the reactor for determining a reactor temperature ($T_r$). The reactor temperature is controlled by the heat which is delivered to the reactor by the in-reactor heater and by the heat that is carried in and/or out by the outer temperature control unit. A dynamic control of the heating power of the in-reactor heater and of the outer temperature control unit is used to eliminate any deviation of the reactor temperature from a reactor set-point temperature.

17 Claims, 5 Drawing Sheets

(56) References Cited

U.S. PATENT DOCUMENTS

| | | | |
|---|---|---|---|
| 7,476,020 | B2 | 1/2009 | Zufferey et al. |
| 7,635,092 | B2* | 12/2009 | Shdaimah et al. .......... 236/44 C |
| 7,712,956 | B2* | 5/2010 | Richner et al. .................. 374/43 |
| 2003/0058918 | A1* | 3/2003 | Fischer et al. .................. 374/31 |
| 2004/0013961 | A1* | 1/2004 | Niwa et al. ................. 430/107.1 |
| 2005/0008063 | A1* | 1/2005 | Chippett ......................... 374/34 |
| 2006/0165151 | A1* | 7/2006 | Esprimont et al. ............. 374/29 |
| 2006/0209628 | A1* | 9/2006 | Jones et al. ................... 366/273 |
| 2010/0255588 | A1* | 10/2010 | Schenker ....................... 436/43 |

FOREIGN PATENT DOCUMENTS

| | | |
|---|---|---|
| EP | 1890138 A1 | 2/2008 |
| JP | S61-65148 A | 4/1986 |
| JP | H06-331459 A | 12/1994 |
| JP | H07-198637 A | 8/1995 |
| JP | H08-211946 A | 8/1996 |
| JP | 2007-319827 A | 12/2007 |

OTHER PUBLICATIONS

Grolier, J-P. E. et al., "The use of advanced calorimetric techniques in polymer synthesis and characterization", Thermochimica Acta, 2006, pp. 47-55, vol. 450, Elsevier.

Schlegel, M. et al., "A reaction calorimeter with compensation heater and differential cooling", Chemical Engineering and Processing, 1998, pp. 61-67, vol. 37, Elsevier.

* cited by examiner

METHOD FOR OPERATING A CALORIMETER

CROSS-REFERENCE TO RELATED APPLICATIONS

This application claims a right of priority under 35 USC §119 from European patent application 08 15 8195.1, filed 13 Jun. 2008, the content of which is incorporated by reference as if fully recited herein.

TECHNICAL FIELD

The disclosed embodiments relate to a method for operating a calorimeter, especially a reaction calorimeter, and to a calorimeter suitable to carry out the method.

BACKGROUND OF THE ART

Calorimeters measure heat flows associated with chemical and/or physical reactions and conversions. They serve to determine thermodynamic and kinetic quantities of a reaction medium. Reaction media that can be used include pure substances or mixtures of substances which are in most cases dissolved in a suitable solvent. The reaction medium can be liquid or gaseous.

Reaction calorimeters can further be used to obtain data that are relevant for the safety of chemical and/or physical reactions, or to establish data of the kind required for example for a so-called scale-up process, i.e. for reproducing a small-volume laboratory reaction in a large-volume process system.

The reaction calorimeter can comprise a reactor or a suitable container, for receiving the reaction medium, that is at least in part encased in a reactor jacket. The temperature of the reaction medium can be controlled in different ways.

The reaction calorimeters of the state of the art are in many cases operated according to the heat flow principle or according to the principle of power compensation.

Under the power compensation principle, which is in most cases performed under isothermal conditions, a compensation heater is arranged in the reactor of the calorimeter. The compensation heater can act directly on the reaction medium and is used to control the temperature in the reactor and/or the temperature of the reaction medium. By means of an associated temperature control unit the temperature of the reactor jacket is kept essentially constant at a level below the reaction temperature.

At the beginning of a measurement, a certain amount of heating power is delivered to the reaction medium by the compensation heater. In the course of the reaction, the delivery of heating power is increased or decreased, depending on whether the reaction is an endothermic or exothermic reaction.

Due to the direct delivery of heat, temperature fluctuations in the reactor can be compensated rapidly. In addition, the analysis of the results is relatively simple, as the delivered heat amount can be determined directly.

However, the compensation heater is only capable of heating, but not of cooling, so that the minimum power delivery to the reactor is around zero watts. This has the consequence that the compensation heater has to permanently deliver energy to the system at a rate corresponding to the maximum heat rate to be measured for an exothermy, i.e. that the reaction generates no heat. The maximum heat rate is not always accurately known at the beginning of an experiment and can only be estimated. For reasons of safety, experiments are therefore conducted mostly with an assumed maximum heat rate that is set too high, which has the consequence that heat is delivered to the reactor by the compensation heater at a quite considerable rate during the entire experiment and subsequently needs to be carried away through the reactor wall.

Due to the high rate at which heat is brought in, the reaction medium can locally overheat in the vicinity of the compensation heater. This can have a negative effect on the course of the reaction as well as on the safety of a reaction taking place in the reactor. In addition, the measurement results exhibit a strong dependency on changes in the heat transfer conditions and thus on the global heat transfer coefficient, wherein the latter is subject to a change over time if the heat flow changes during the experiment for example because of a change of the viscosity of the reaction medium. A change can likewise occur in the heat exchange surface due to chemical or physical processes, as a result of adding a substance or taking a sample, whereby the global heat transfer coefficient can also be affected.

Under the heat flow principle, the temperature in the reactor is controlled by the temperature of the reactor jacket. The latter is in most cases connected to a temperature control unit which is capable of cooling as well as heating. This principle has the advantage that the reactor jacket provides a relatively large heat exchange surface with the reactor, so that conditions of local overheating in the reaction medium can essentially be avoided. However, the temperature control is relatively sluggish in comparison to power compensation, and the heat capacity of the reactor jacket needs to be taken into account in the process of determining the quantities to be measured.

A reaction calorimeter with a reactor jacket and a compensation heater is disclosed in DE 44 05 267 A1, wherein the reactor jacket has an essentially constant temperature over time and the compensation heater keeps the reactor at a constant temperature, responding with a small time constant. For adiabatic measurements, the temperature of the reactor jacket can be made to follow the temperature inside the reactor, the latter being equipped for this purpose with a supplemental heater. This reaction calorimeter represents a combination of the two principles described above.

It is therefore an object to provide an improved method for the safe operation of a calorimeter, as well as to provide a suitable calorimeter, wherein the advantages of the power compensation principle and the heat flow principle are advantageously combined and an automatic tracking of the reactor jacket temperature is possible.

SUMMARY

The foregoing objective is met by a method for operating a calorimeter, in particular a reaction calorimeter, wherein the calorimeter comprises: a reactor for receiving a reaction medium; an inner heater arranged in the reactor and controlled by a first controller; an outer temperature control unit in thermal contact with the reactor, in particular with at least one outer surface of the reactor, and controlled by a second controller; and a measurement sensor arranged in the reactor for determining a reactor temperature; and wherein the reactor temperature is controlled by the heat delivered to the reactor by the inner heater and by the heat carried in and/or out by the outer temperature control unit. The method is characterized in that the heating power of the inner heater and the outer temperature control unit are controlled dynamically, dependent on a change of the reactor temperature.

The method further comprises the following steps: First, a reactor set-point temperature is set which is entered into the first controller as an input signal. Subsequently, the reactor temperature can be measured at predetermined time intervals and a deviation of the reactor temperature from the set-point temperature can be determined as control deviation of the first controller. This control deviation is divided into a first part and a second part according to predetermined criteria. The first part is on the one hand put into the reactor by the inner heater as heat. On the other hand, the first and second parts are entered into the second controller for controlling the outer temperature control unit. The method has the effect that as a result of the heat carried into and/or out of the reactor, the reactor temperature can be adjusted to match the set-point temperature of the reactor.

The dynamic control of both heaters is very advantageous as it allows the same calorimeter to be used for reactions and experiments having very different heat coefficients. In addition, a calorimeter that is operated in accordance with the foregoing method is especially safe, because depending on the magnitude of the deviation of the reactor temperature, the latter can be adjusted to the set-point temperature either by means of the inner heater or by means of the outer temperature control unit. As a further aspect, the method makes it possible that the heat delivered by the outer temperature control unit to the reactor, and thus the temperature of the reactor jacket, is controlled nearly automatically without the need for a user to preset these temperatures, so that errors can be avoided in estimating the amount of heat to be removed in an experiment and in estimating the corresponding starting temperature of the outer temperature control unit, whereby the safety of the experiments can be increased.

The control deviation as determined according to this method serves to control the temperatures of the inner heater and of the outer temperature control unit through the first and second controllers. This kind of control is advantageous because it allows a change or deviation from the reactor set-point temperature to be compensated by the comparatively fast and powerful inner heater which is arranged in the reactor itself and—additionally or alternatively—by the more sluggish outer temperature control unit, whereby the error in the measurement result can be reduced and the measurements become more accurate.

The reactor temperature can be measured with the measurement sensor for example in predetermined time intervals or continuously, so that the control deviation can be determined in predetermined time intervals or continuously.

The split-off first part can for example correspond to a predetermined set-point range, so that the inner heater is used primarily for controlling smaller temperature deviations and the outer temperature control unit primarily for controlling larger temperature deviations. Furthermore, the first part can have the form of a sigmoid function, so that the ratio between the respective heating powers or heat delivery rates of the inner heater and of the outer temperature control unit is adjusted to the magnitude of the temperature deviation. In either case, a local overheating of the reaction medium by an excessive heat delivery of the inner heater can be strongly reduced and, with preference, even entirely avoided.

The second controller is preferably configured as a cascade controller. In this configuration, the first part of the control deviation can be sent as input to the proportional operator (P) and the second part of the control deviation can be sent as input to the integrating operator (I) of the second controller.

In a preferred embodiment, the inner heater is configured as an electrical heater whose power is controlled by the first controller. An example for an electrical heater is a resistance heater which is arranged in the reactor in the form of a rod or a heating coil and can be brought into contact with the reaction medium. These heaters respond rapidly to controlling, so that in particular small temperature deviations in the reactor can be compensated quickly.

The temperature of the outer temperature control unit is controlled by the second controller. The outer temperature control unit can cooperate with a reactor jacket. If the second controller is configured as a cascade controller, it is advantageous if the temperature of the reactor jacket is a variable of the inner control loop of the cascade controller. The reactor jacket can for example be a double-walled jacket filled with a heat-distributing medium as disclosed for example in EP 1 764 662 A1. As a further possibility, the reactor jacket can be configured as a metal block which contains a cavity for the reactor and whose temperature is controlled for example by means of a Peltier element. A calorimeter of this kind is described for example in EP 1 890 138 A1.

The second part of the control deviation is preferably converted into a residual temperature and fed as input to the second controller which controls the outer temperature control unit.

A calorimeter which is operated in accordance with the foregoing method comprises a reactor for receiving a reaction medium, an inner heater arranged in the reactor and capable of being controlled by a first controller, and an outer temperature control unit in thermal contact with at least one reactor wall and capable of being controlled by a second controller, wherein a first measurement sensor for determining a reactor temperature is arranged in the reactor. The reactor temperature can be controlled by the heat delivered to the reactor by the inner heater and/or by the heat carried into and/or out of the reactor by the outer temperature control unit, so that the inner heater and the outer temperature control unit can be dynamically controlled dependent on a deviation of the reactor temperature.

In a preferred embodiment, the second controller is a cascade controller.

The steps of the method can be implemented in a computer program which is stored in a control unit of the calorimeter and which serves to control the calorimeter.

This embodiment is particularly advantageous as it also offers for example the possibility to automate the operation of the calorimeter.

BRIEF DESCRIPTION OF THE DRAWINGS

A calorimeter with the capability to perform the method, as well as some first comparison measurements, will be discussed in more detail on the basis of the following drawing figures, wherein.

DETAILED DESCRIPTION OF A PREFERRED EMBODIMENT

Figure 1:
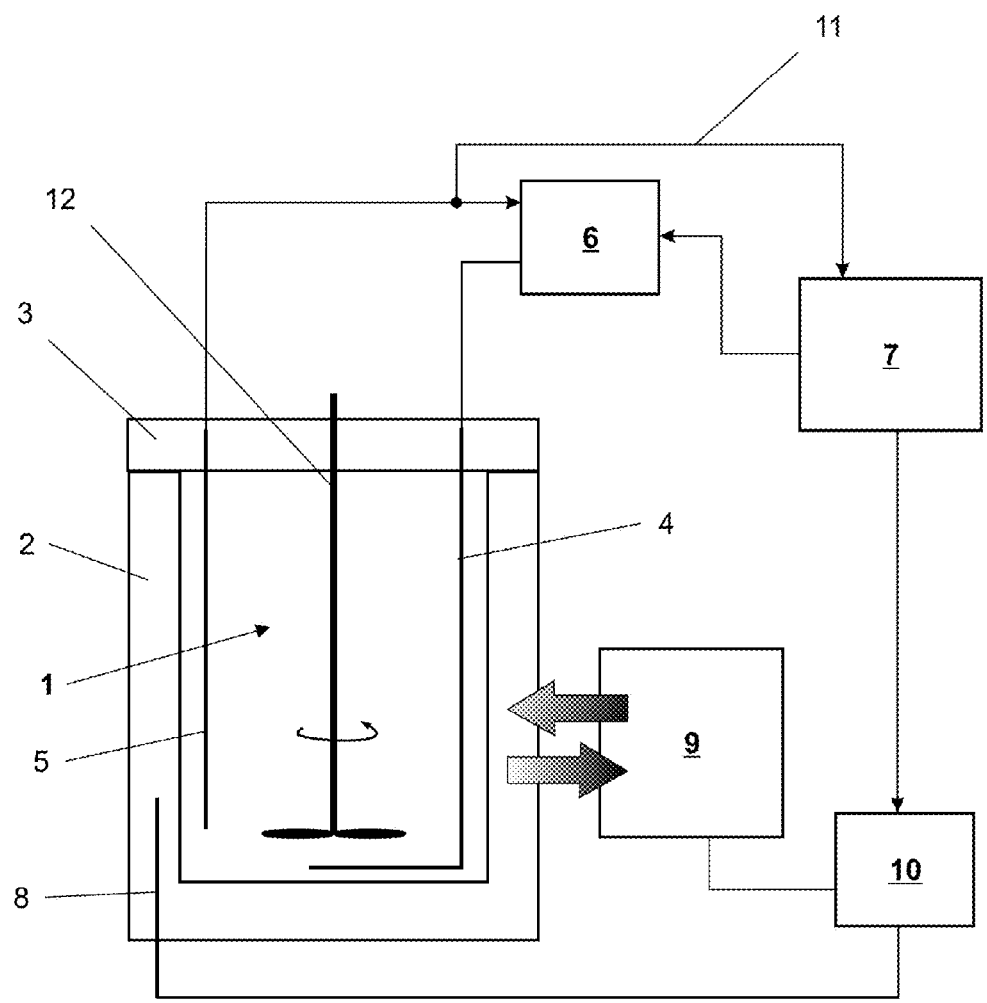
FIG. 1 is a schematic block diagram of an embodiment of the calorimeter.

FIG. 1 represents an embodiment of a calorimeter, shown in a strongly simplified schematic view. The calorimeter essentially comprises a reactor 1 surrounded by a reactor jacket 2, which can be closed with a lid 3. Arranged in the reactor 1 are an in-reactor heater 4 and a stirrer 12. The in-reactor heater 4 is preferably a resistance heater which is capable of rapidly heating a reaction medium contained in the reactor 1. At least one measurement sensor 5 is arranged in the reactor 1 for the measurement of the temperature $T_r$ inside the reactor. The measurement sensor 5 is installed with such an orientation that the sensor descends into a reaction medium.

The in-reactor heater 4 and the measurement sensor 5 are electronically connected to a first controller 6. The first controller 6 controls the in-reactor heater 4 based on the reactor set-point temperature $T_{r,set}$ which is provided by a main controller 7. The first controller 6 is electronically connected to the main controller 7.

A further measurement sensor 8 serves to measure the temperature $T_j$ of the reactor jacket 2. The reactor jacket 2 can be configured for example as a block of metal or as a double-walled reactor jacket filled with a heat-distributing medium. The temperature $T_j$ of the reactor jacket can be controlled by a temperature control unit 9 as indicated by the arrows. Depending on the configuration of the reactor jacket 2, the temperature $T_j$ of the latter can be measured with the measurement sensor 8 or determined through the temperature of the heat-distributing medium which flows through the reactor jacket 2.

The further measurement sensor 8 and the temperature control unit 9 are electronically connected to a second controller 10 which controls the temperature $T_j$ of the reactor jacket 2 based on given set-point values $T_{j,set}$. These set-point values $T_{j,set}$ of the reactor jacket temperature are calculated in the main controller 7 based on the control deviation $\Delta T_r$ of the actual reactor temperature $T_{r,ist}$ from the reactor set-point temperature $T_{r,set}$ and serve as input for the second controller 10. For this purpose, the actual reactor temperature $T_{r,ist}$ is fed as input into the main controller 7, as indicated by the connection 11 in FIG. 1. Accordingly, the part contributed to the reactor temperature $T_r$ by the in-reactor heater 4 as well as the part contributed by the reactor jacket 2, both of which are controlled by the power consumed and/or heat given off, are controlled directly by the temperature difference of the control deviation $\Delta T_r$.

For the sake of clarity, the first and second controllers 6, 10 as well as the main controller 7 are represented here as separate units. Of course, all three controllers can be incorporated together in a single control unit.

The calorimeter is characterized in that the reactor temperature $T_r$ can be controlled dynamically by the in-reactor heater 4 and the reactor jacket 2 based on the control deviation $\Delta T_r$. The temperature difference or temperature deviation $\Delta T_r$ is caused primarily by a heat absorption or heat release of the reaction medium in the reactor 1.

Figure 2:
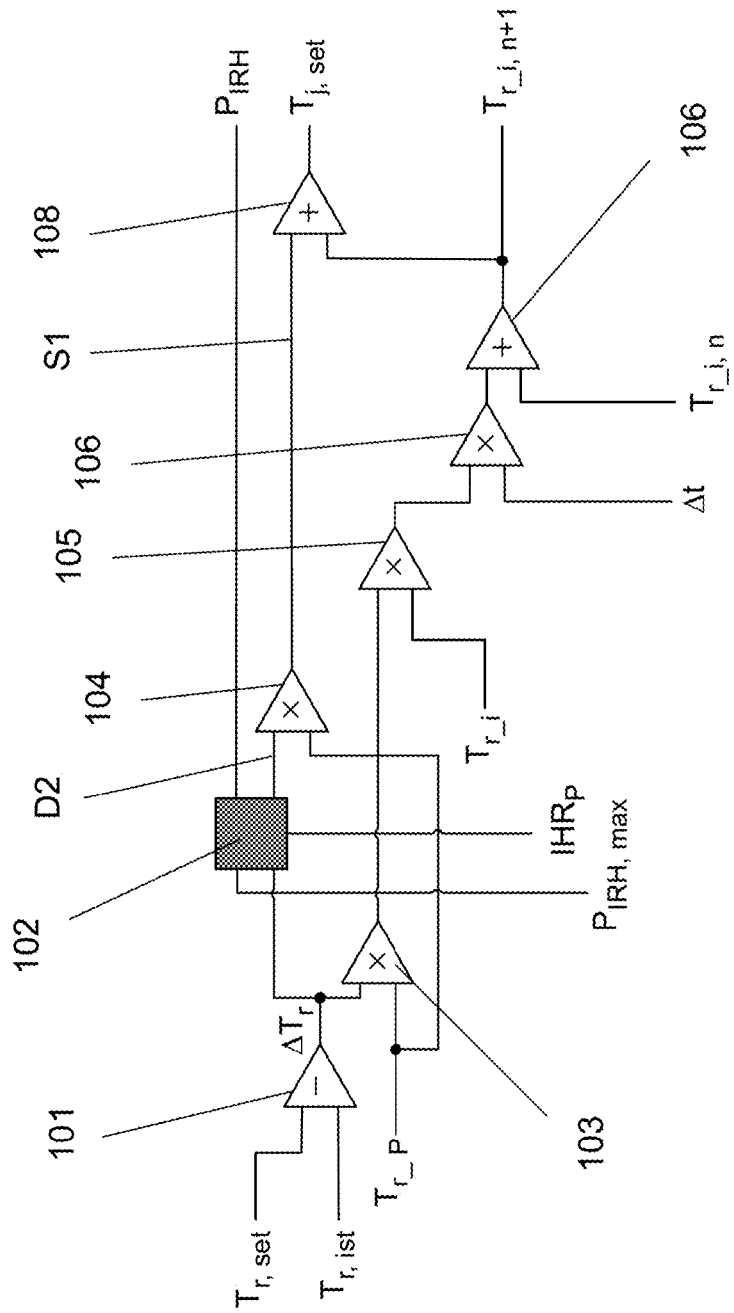
FIG. 2 is a simplified circuit of the temperature control of the FIG. 1 calorimeter.
Figure 3:
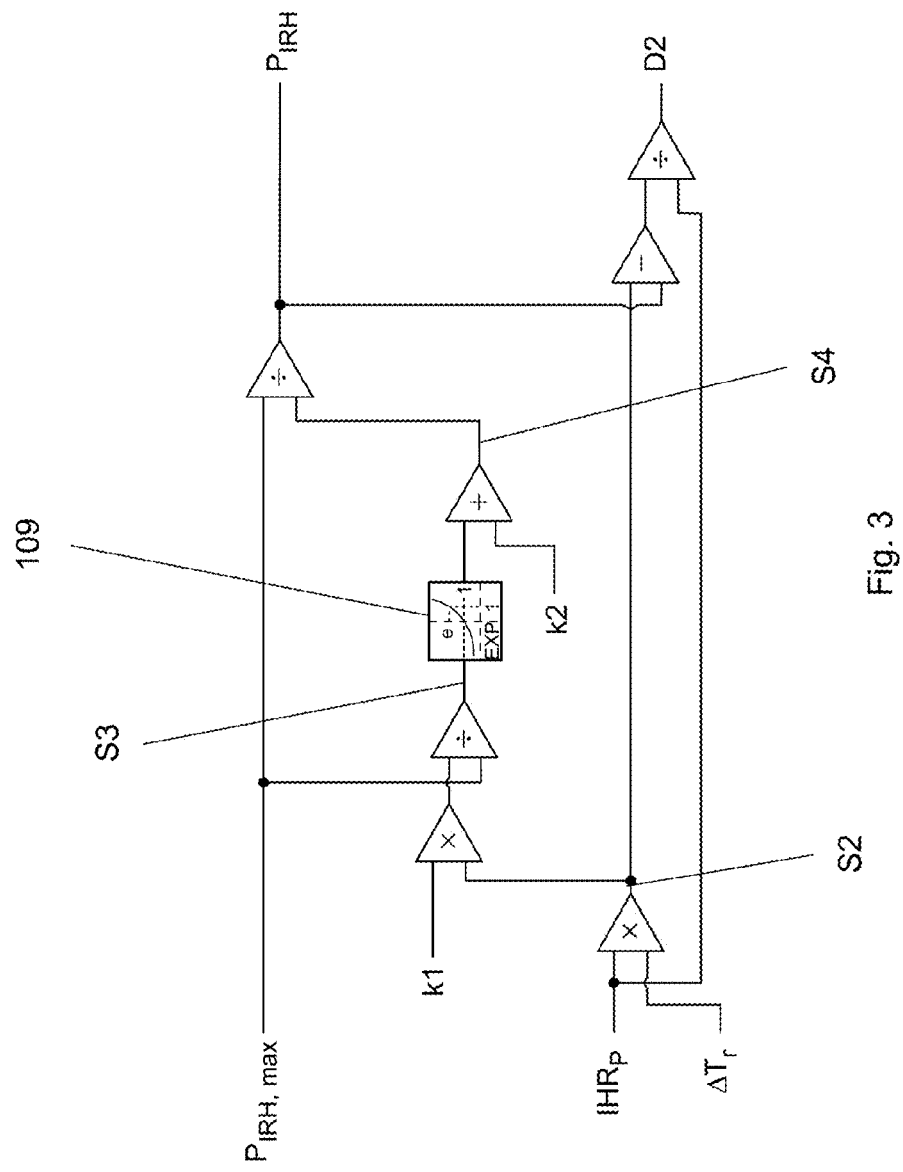
FIG. 3 is simplified representation of the delta-T splitter of FIG. 2.

For a better understanding of the dynamic temperature control of a calorimeter, FIG. 2 shows a simplified circuit of the temperature control. A delta-T splitter 102 of the kind that is used in the circuit of FIG. 2 is shown in FIG. 3. The temperature control is shown here in the form of a digital block diagram. Of course, a temperature control of this kind can also be realized as an analog circuit.

As is apparent from FIG. 2, a reactor set-point temperature $T_{r,set}$ is provided, which is selected by the user dependent on the reaction medium that is to be investigated. The quantity represented by $T_{r,set}$ can be a temperature which stays constant over the course of the experiment, or it could also be a time-dependent temperature according to a program which dictates or adjusts the reactor set-point temperature $T_{r,set}$ at predetermined time intervals or continuously.

During the experiment, the actual reactor temperature $T_{r,ist}$ is measured continuously or in given time intervals. Next, the difference of the two temperatures, $\Delta T_r = (T_{r,set} - T_{r,ist})$ is determined as the control deviation (see block 101 in FIG. 2). This temperature difference $\Delta T_r$ is on the one hand fed as one of three signals to the delta-T splitter 102, and on the other hand—as symbolized by block 103 in FIG. 2—$\Delta T_r$ is multiplied with the proportional part $T_{r\_P}$ of the reactor-temperature control occurring by the reactor jacket.

The delta-T splitter 102, whose configuration and functional concept is illustrated in FIG. 3, receives as further inputs a proportional part $IRH_P$ of the first controller and the maximum power $P_{IRH,max}$ of the in-reactor heater.

For the determination of the set-point temperature $T_{j,set}$ of the reactor jacket, the output signal of the delta-T splitter 102 is multiplied on the one hand with the proportional part $T_{r\_P}$ of the reactor-temperature control that occurs by way of the reactor jacket, as symbolized by block 104 in FIG. 2. $T_{j,set}$ represents in this case the set-point value of the inner cascade controller for the temperature $T_j$ of the reactor jacket.

The signal $S_1$, which is generated by the foregoing operation, represents a second part of the control deviation and is added to a further signal 108 which is generated according to the following equation, as symbolically represented in FIG. 2 through the operators 101 and 103 to 108:

$$T_{j,set} = S1 + ((\Delta T_r \cdot T_{r\_P}) \cdot T_{r\_i} \cdot \Delta t + T_{r\_i,n+1}),$$

with $$T_{r\_i,n+1} = (\Delta T_r \cdot T_{r\_P}) \cdot T_{r\_i} \cdot \Delta t + T_{r\_i,n},$$

wherein $T_{r\_i}$ represents the integral part of the $T_r$-controller, $T_{r\_P}$ represents the proportional part, $\Delta t$ represents the time interval between two measurements, $T_{r\_i,n}$ represents the integral part of the n-th point of the measurement series, and $T_{r\_i,n+1}$ represents the integral part of the (n+1)-th point of the measurement series.

As a further output signal, the delta-T splitter 102 generates a first part of the control deviation which is converted into a power $P_{IRH}$ and delivered as heat through the in-reactor heater to the reaction medium and/or to the reactor.

FIG. 3 shows the delta-T splitter of FIG. 2. Among other functions, the delta-T splitter serves to determine the power $P_{IRH}$ delivered through the in-reactor heater to the reactor, as can be seen in FIG. 3.

The determined temperature difference $\Delta T_r$ is multiplied with the P-part of the first controller. This is essentially analogous to the control of a state-of-the-art compensation heater. The second signal S2 generated thereby is multiplied with a first factor k1 and divided by the maximum power $P_{IRH,max}$. This operation produces a third signal S3, which is then being delimited by a function 109, for example in the form of a set-point value or a sigmoid function. Now a second factor k2 is added to the third signal. First experiments have shown that the first factor can preferably be set as k1=−4 and the second factor as k2=1, whereby an optimal dynamic control between the in-reactor heater and the outer temperature control unit is obtained. The amounts stated here for these two factors are meant only as examples and should be adapted to the calorimeter being used. Furthermore, the control parameters shown in FIG. 2, in particular $T_{r\_P}$, $T_{r\_i}$ and $IHR_P$ should likewise be adapted to the calorimeter being used. The power maximum $P_{IRH,max}$ of the in-reactor heater can be freely selected and should likewise be adapted to the selected parameters as well as to the reaction to be performed. The maximum power $P_{IRH,max}$ of the in-reactor heater is now divided by the fourth signal S4 generated in the preceding step, and the result of the division represents the power $P_{IRH}$ which is delivered to the reactor through the in-reactor heater.

In addition, the difference between the non-delimited and the delimited power for the in-reactor heater is being determined and converted into a temperature difference which represents the second output signal D2 of the delta-T splitter. This is accomplished by subtracting from the second signal S2 the value of the delimited output $P_{IRH}$ and dividing the difference by the P-part $IRH_P$ of the second controller. As shown in FIG. 2, this difference enters into the determination of the set-point temperature for the reactor jacket.

Figure 4:
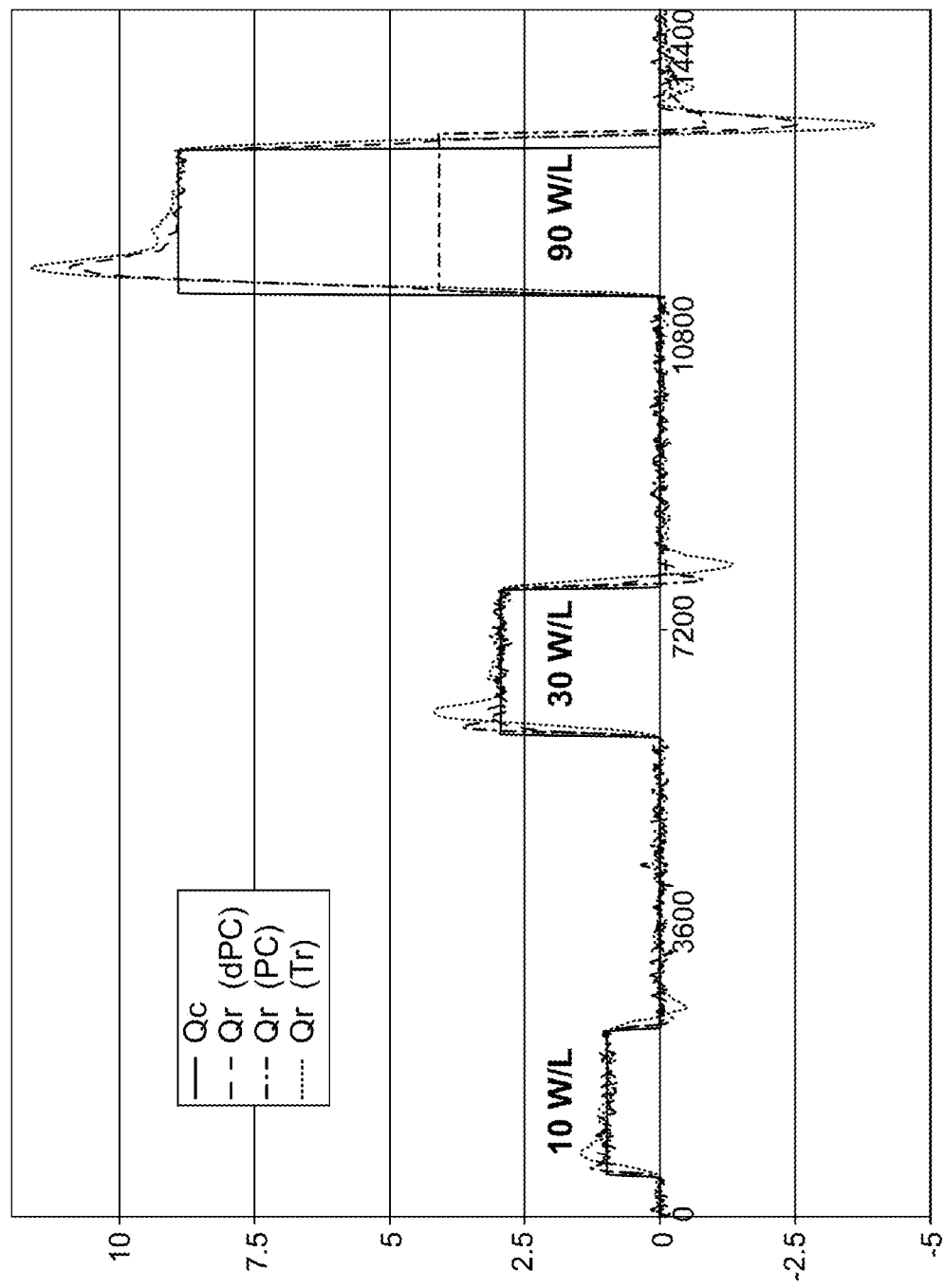
FIG. 4 represents a comparison of the amounts of reaction heat of a calorimeter operated according to different principles with a power of 10 W/L, 30 W/L and 90 W/L.
Figure 5:
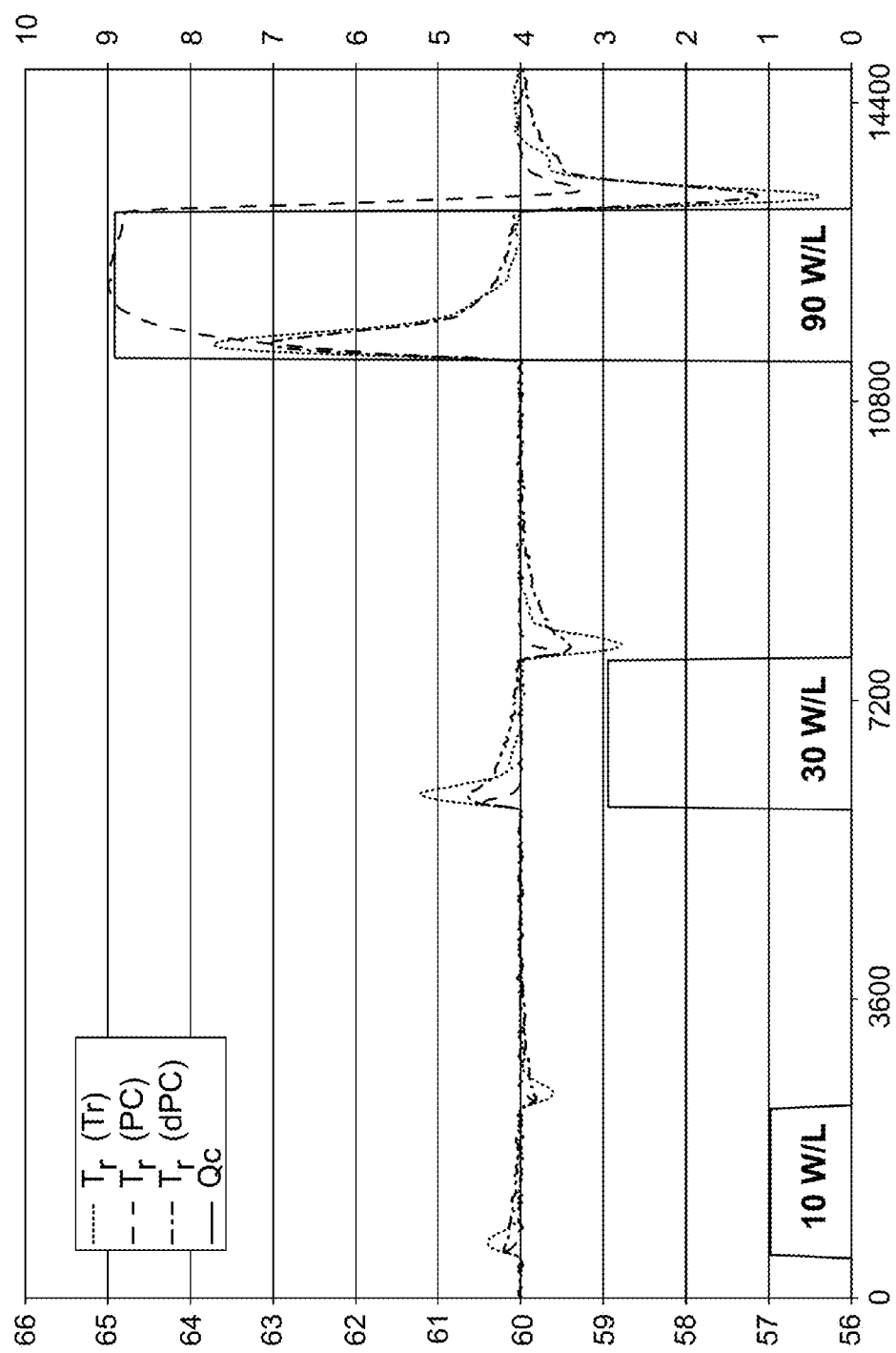
FIG. 5 represents a comparison of the quality of the control of the reactor temperature with a power of 10 W/L, 30 W/L and 90 W/L.

FIGS. 4 and 5 represent comparative measurements using the heat flow method (Tr) of the prior art, the power compensation method (PC) of the prior art, and the dynamic power compensation method (dPC) taught herein. FIG. 4 shows the reaction heat Qr for the three methods with a power perturbation Qc of 10 W/L, 30 W/L and 90 W/L. The power perturbations are meant to simulate different reactions and their heat of reaction. FIG. 5 shows a comparison of the respective reactor temperatures $T_r$ of the three methods with different power perturbations Qc of 10 W/L, 30 W/L and 90 W/L. The comparison demonstrates that for low power perturbations, a calorimeter being operated according to the present method behaves in a similar way as a calorimeter operated according to the power compensation method. For higher power perturbations, the behavior is more comparable to a calorimeter that is being operated according to the heat flow principle. In particular, the measurement values obtained with 90 W/L clearly show the limitation of the power compensation method in cases where the power to be measured is larger than the compensation power in the absence of heat release. A calorimeter that is being operated according to the power compensation method has in this case neither the capability for an error-free determination of the reaction power, nor can the reactor temperature be held constant. In contrast, as shown in FIGS. 4 and 5, both of these tasks can be performed without a problem with the present dynamic power compensation method.

What is claimed is:

1. A method for operating a calorimeter comprising a reactor for receiving a reaction medium, a reactor jacket, an in-reactor heater controlled by a first controller, an outer temperature control unit in thermal contact with the reactor and controlled by a second controller, and a measurement sensor arranged in the reactor, the method comprising the steps of:
    setting a set-point temperature for the reactor and entering the reactor set-point temperature into the first controller;
    determining a reactor temperature using the measurement sensor and determining a deviation of the reactor temperature from the reactor set-point temperature as a control deviation of the first controller, the reactor temperature being controlled by the heat delivered to the reactor by at least one of the in-reactor heater and the outer temperature control unit and by the heat taken away from the reactor by the outer temperature control unit;
    splitting the determined control deviation into first and second parts, and dynamically adjusting the power, to compensate for the control deviation, through the substeps of:
        delivering the first part as heat to the reactor by the in-reactor heater, and
        entering the first and second parts into the second controller for controlling the outer temperature control unit, and
    adjusting the reactor temperature to the reactor set-point temperature as a result of the heat carried into and/or out of the reactor.

2. The method of claim 1, wherein:
the step of determining the reactor temperature occurs at predetermined time intervals or continuously.

3. The method of claim 2, wherein:
the first part of the control deviation corresponds to a set-point range.

4. The method of claim 2, wherein:
the first part of the control deviation has the form of a sigmoid function.

5. The method of claim 2, wherein:
the substep of entering the first and second parts of the control deviation to the second controller, which is configured as a cascade controller, is achieved by:
delivering the first part to a proportional operator of the second controller; and
delivering the second part to an integrating operator of the second controller.

6. The method of claim 5, wherein:
the substep of delivering the first part of the control deviation power as heat to the reactor is achieved by the in-reactor heater, which is an electrical heater whose power is controlled by the first controller.

7. The method of claim 6, wherein:
the second controller controls a temperature of a reactor jacket that cooperates with the outer temperature control unit.

8. The method of claim 7, comprising the step of:
calculating an input for the second controller, using the second part of the control deviation and feeding the calculated input into the second controller.

9. The method of claim 1, wherein:
the substep of entering the first and second parts of the control deviation to the second controller, which is associated with the first controller as a cascade controller, is achieved by:
delivering the first part to a proportional operator of the second controller; and
delivering the second part to an integrating operator of the second controller.

10. The method of claim 1, wherein:
the substep of delivering the first part of the control deviation power as heat to the reactor is achieved by the in-reactor heater, which is an electrical heater whose power is controlled by the first controller.

11. The method of claim 1, wherein:
the second controller controls a temperature of a reactor jacket that cooperates with the outer temperature control unit.

12. The method of claim 1, wherein:
the step of splitting the determined control deviation occurs in a logic circuit, based upon predetermined inputs, including the maximum power of the in-reactor heater and a proportional part of the first controller.

13. A calorimeter, comprising:
a reactor for receiving a reaction medium;
an in-reactor heater to supply heat to the reactor;
a first controller, in controlling communication with the in-reactor heater;
an outer temperature control unit in thermal contact with the reactor for supplying heat thereto or removing heat therefrom;
a second controller, in controlling communication with the outer temperature control unit and in communication with the first controller;
a first measurement sensor, arranged in the reactor for determining a reactor temperature, the first measurement sensor in communication with at least the first controller so that a deviation of the reactor temperature from a reactor set-point temperature is dynamically adjusted through the heating power of the in-reactor heater and the outer temperature control unit; and a control unit on which a computer program is stored, the computer program comprising an instruction set that implements an operating method that comprises the steps of:

setting a set-point temperature for the reactor and entering the reactor set-point temperature into the first controller;

determining a reactor temperature using the measurement sensor and determining a deviation of the reactor temperature from the reactor set-point temperature as a control deviation of the first controller, the reactor temperature being controlled by the heat delivered to the reactor by at least one of the in-reactor heater and the outer temperature control unit and by the heat taken away from the reactor by the outer temperature control unit;

splitting the determined control deviation into first and second parts, and dynamically adjusting the power, to compensate for the control deviation, through the sub-steps of:

delivering the first part as heat to the reactor by the in-reactor heater, and entering the first and second parts into the second controller for controlling the outer temperature control unit, and adjusting the reactor temperature to the reactor set-point temperature as a result of the heat carried into and/or out of the reactor.

14. The calorimeter of claim 13, further comprising:
a reactor jacket that cooperates with the outer temperature control unit.

15. The calorimeter of claim 14, wherein:
the second controller is in a cascade arrangement with the first controller.

16. The calorimeter of claim 13, wherein:
the second controller is in a cascade arrangement with the first controller.

17. The calorimeter of claim 13, further comprising:
a further controller, communicated to each of the first and second controllers, the further controller operating to communicate the first and second controllers with each other.

* * * * *